United States Patent [19]

Rudolf et al.

[11] 4,287,233

[45] Sep. 1, 1981

[54] MANUFACTURE OF ACICULAR COBALT-CONTAINING MAGNETIC IRON OXIDE

[75] Inventors: Peter Rudolf, Neuhofen; Werner Steck, Mutterstadt; Eberhard Koester; Manfred Ohlinger, both of Frankenthal; Christof Jaeckh, Heidelberg, all of Fed. Rep. of Germany

[73] Assignee: BASF Aktiengesellschaft, Fed. Rep. of Germany

[21] Appl. No.: 116,543

[22] Filed: Jan. 29, 1980

[30] Foreign Application Priority Data

Feb. 13, 1979 [DE] Fed. Rep. of Germany ....... 2905352

[51] Int. Cl.³ .......................................... C01G 49/06
[52] U.S. Cl. ................................ 427/127; 252/62.56; 427/128; 427/130
[58] Field of Search ..................... 252/62.56; 427/127, 427/128, 130, 215

[56] References Cited

U.S. PATENT DOCUMENTS

| 3,081,264 | 3/1963 | Nobuoka et al. | |
|---|---|---|---|
| 3,117,733 | 1/1964 | Cleemann . | |
| 3,573,980 | 4/1971 | Haller et al. . | |
| 4,188,302 | 2/1980 | Becker et al. | 252/62.56 |

FOREIGN PATENT DOCUMENTS

| 2100390 | 9/1971 | Fed. Rep. of Germany . | |
|---|---|---|---|
| 2811473 | 8/1978 | Fed. Rep. of Germany . | |
| 50-37667 | 4/1975 | Japan | 252/62.65 |
| 1268458 | 3/1972 | United Kingdom . | |
| 1318579 | 5/1973 | United Kingdom . | |
| 1432643 | 4/1976 | United Kingdom . | |
| 1441183 | 6/1976 | United Kingdom . | |

Primary Examiner—Jack Cooper
Attorney, Agent, or Firm—Keil & Witherspoon

[57] ABSTRACT

A process for the manufacture of acicular magnetic iron oxide consisting of core of gamma-iron(III) oxide and a ferrite shell which contains, based on the total amount of magnetic material, from 0.2 to 12 per cent by weight of cobalt(II) ions and from 0.1 to 15 per cent by weight of iron(II) ions, wherein a precipitate of cobalt(II) hydroxide and iron (II) hydroxide is applied to acicular gamma-iron(III) oxide particles and the latter are heated at 100°–200° C.

4 Claims, 4 Drawing Figures

MANUFACTURE OF ACICULAR COBALT-CONTAINING MAGNETIC IRON OXIDE

The present invention relates to a process for the manufacture of acicular magnetic iron oxide consisting of a core of gamma-iron(III) oxide and a ferrite shell containing, based on the total amount of magnetic material, from 0.2 to 12 percent by weight of cobalt(II) ions and from 0.1 to 15 percent by weight of iron(II) ions.

Acicular gamma-iron(III) oxide has been employed for a long time and on a large scale as a magnetizable material in the manufacture of magnetic recording media. However, as a result of continued development in the field of recording technology, there is an increasing need for magnetic materials which in particular have a higher coercive force than gamma-iron(III) oxide. It is true that the coercive force of iron oxides can, under certain circumstances, be substantially increased by modification with cobalt, but such modified materials show a number of undesirable properties, in particular the residual induction and coercive force thereof are unstable to thermal and mechanical factors. Materials having these disadvantages are unsuitable for use in magnetic recording media.

Cobalt-containing acicular iron oxides are obtainable by a number of processes. According to German Pat. Nos. 1,112,725 and 1,226,997, cobalt modification can easily be achieved by co-precipitation of iron hydroxide and cobalt hydroxide during the manufacture of goethite, since the subsequent conversion of the cobalt-containing goethite to the corresponding gamma-iron(III) oxide is carried out in the conventional manner. German Laid-Open Application DOS No. 2,100,390 also proposes a similar procedure.

According to German Published Application DAS No. 2,036,612, a cobalt compound can also be precipitated onto the surface of a gamma-iron(III) oxide. The cobalt is incorporated into the iron oxide lattice by subsequent heating at 380°–400° C. A different procedure is disclosed in German Laid-Open Application DOS No. 2,243,231. Here, the acicular iron oxide hydroxide, before being reduced to magnetite, is provided with a protective coating to avoid sintering of the needles, and after application of the cobalt compound to the magnetite or to the gamma-iron oxide the product is heat-treated. A further method of obtaining cobalt-containing acicular iron oxide is described in German Laid-Open Application DOS No. 2,022,013. Here, acicular FeOOH or $Fe_2O_3$ is mixed with a liquid containing a cobalt compound, the slurry is dried and then, using conventional processes, the material is either converted to gamma-iron(III) oxide or, where gamma-iron(III) oxide was employed as starting material, is merely sintered. It is also known from German Published Application DAS No. 1,907,236 that cobalt-containing acicular gamma-iron(III) oxide can be prepared by suspending gamma-iron(III) oxide as such, or an oxide obtained as an intermediate in its manufacture, in an aqueous medium, precipitating a cobalt compound onto the oxide and then heating the product at a temperature high enough to decompose the cobalt compound. The partial reduction of the cobalt-modified gamma-iron(III) oxide obtained by the above process, in order to increase the coercive force, has also been proposed.

It has also already been attempted to increase the coercive force of iron oxides by coating acicular oxides with an epitaxial layer of cobalt ferrite (British Pat. No. 1,441,183). A similar procedure is described in German Laid-Open Application DOS No. 2,811,473. There, the cobalt ferrite layer is produced by simultaneously applying cobalt ions and iron ions to the iron oxide and carrying out a cautious oxidation.

The cobalt-containing acicular iron oxides produced by the prior art methods do not have entirely satisfactory magnetic properties and in most cases exhibit heat instability and/or mechanical instability. The desired high coercive force is only achieved by varying the relatively high content of cobalt, which then leads to the well-known disadvantages. Reducing the amount of cobalt and at the same time increasing the treatment temperature does not give products which, when used in magnetic recording media, meet the necessary requirements.

It is an object of the present invention to provide a simple process for the manufacture of a cobalt-containing acicular magnetic iron oxide which is suitable for use as a magnetizable material in magnetic recording media and which exhibits a very high coercive force, the temperature dependence of the magnetic properties being only slight, and a narrow field strength distribution.

We have found that this object is achieved and that an acicular magnetic iron oxide which has the desired properties and which consists of a core of gamma-iron(III) oxide surrounded by a ferrite shell containing, based on the amount of magnetic material, from 0.2 to 12 percent by weight of cobalt(II) ions and from 0.1 to 15 percent by weight of iron(II) ions can be manufactured if one part by weight of acicular gamma-iron(III) oxide is suspended in not more than four parts by weight of water by vigorous stirring, aqueous solutions containing cobalt(II) ions and iron(II) ions and aqueous bases to bring the pH to not less than 10 are added to this suspension at from 20 to 80° C. under an inert gas blanket, with continued stirring, and after the cobalt(II) hydroxide and iron(II) hydroxide precipitate has formed under the inert gas atmosphere the entire solid product is filtered off, washed neutral with water and heated for from one to seven hours at from 100° to 220° C.

These acicular cobalt-containing magnetic iron oxides produced by the process according to the invention thus possess a core of the gamma-iron(III) oxide employed and an outer shell, surrounding this core, which consists predominantly of magnetite and cobalt(II) ions embedded therein in the form of cobalt ferrite.

Suitable starting materials for the process according to the invention are the acicular magnetic gamma-iron(III) oxides produced by conventional methods. These iron oxide particles have a mean length of from 0.2 to 1 μm and a length-to-width ratio of from 6:1 to 20:1. The particles are obtained by converting acicular iron(III) oxide hydroxide to magnetite in a reducing atmosphere and then oxidizing the magnetite to gamma-iron(III) oxide at below 400° C. When appropriate, a heat treatment may be carried out before or after reduction in order to improve the mechanical and magnetic properties. It is also possible to treat the various iron oxide intermediates in the production of the gamma-iron(III) oxide with inorganic or organic substances, for example to retain the shape of the particles, and such a treatment may in special cases prove advantageous. A suitable gamma-iron(III) oxide can also be produced by coating an acicular non-magnetic iron oxide or iron oxide hydroxide with a higher hydrocarbon, higher alcohol, amine, fatty acid or fatty acid salt, and converting the oxide to gamma-iron(III) oxide at about 400°–650° C. in the presence of air.

The iron(II) and cobalt(II) compounds required for the process according to the invention must be selected so that they are non-oxidizing in aqueous alkaline solution and so that they form the corresponding hydroxides. Advantageously, the chlorides and sulfates of the metals are employed.

To carry out the process according to the invention, the gamma-iron(III) oxide is suspended in not more than four, preferably in from 2 to 3, parts by weight of water by vigorous stirring or by means of other conventional equipment. The aqueous solutions containing cobalt(II) ions and iron(II) ions and the aqueous bases can be added to the resulting suspension in any desired sequence. From the further processing point of view, it has proved particularly advantageous first to introduce the aqueous solution containing cobalt(II) ions into the suspension. By subsequently adding aqueous bases, especially sodium hydroxide, the pH of the suspension is brought to not less than 10 and preferably to not less than 12. After stirring for about one hour, the aqueous solution containing iron(II) ions is added. It is advisable to continue vigorous stirring for a prolonged period thereafter; from four to seven hours has proved advantageous and sufficient. The entire reaction, but in particular from the addition of the iron(II) ions, is carried out under an inert gas blanket. The reaction temperature should be from 20° to 80° C.; it has proved advantageous to carry out the process at room temperature.

After this precipitation of cobalt(II) hydroxide and iron(II) hydroxide has taken place in the gamma-iron(III) oxide suspension, all the solids are filtered off and washed with water until the wash liquor is neutral. The filter cake is then heated for from one to seven, preferably from two to four, hours at from 100° to 220° C., for example in a rotary kiln. This both dries and heat-treats the product formed in the reaction described above; the treatment can be carried out in a stream of inert gas or in a stream of air. If drying and heating is carried out in a stream of inert gas, usually nitrogen, at, preferably, from 130° to 180° C., the period of heating is advantageously from two to seven hours. If the filter cake is treated in an oxidizing atmosphere, i.e. in a stream of air, appropriate parameters are a temperature of from 110° to 150° C. and a heating period of from one to three hours. However, this process step can also be carried out by first drying the filter cake in a stream of air at from 100° to 120° C. and then heating it under an inert gas for from one to three hours at from 130° to 180° C.

The acicular cobalt-containing iron oxides which have been modified by the process according to the invention exhibit a number of improvements over prior art products. Thus, the magnetic materials produced by the novel process have a higher coercive force and a narrower field strength distribution. Accordingly, by using the method described, it is possible to combine the advantageous properties of gamma-iron(III) oxide with those of magnetite and of cobalt ferrite without having to accept the disadvantages of the last-mentioned compound, such as poor orientability, a broad field strength distribution, thermal instability of the magnetic properties, and high magnetostriction.

It is advantageous if the temperature dependence of the coercive force and of the residual induction of such cobalt-containing products is only slightly less good than that of pure gamma-iron(III) oxide. Only in this case do the improved magnetic properties of the cobalt-containing magnetic materials fully contribute to improving the recording properties of magnetic recording media made from these materials. The temperature dependence of the coercive force and that of the residual induction are each expressed as a TA value. For this, the coercive force and relative remanence are determined at −100° C. and at +25° C., the quotient for each parameter is calculated, and both the results are quoted. Unmodified gamma-iron(III) oxide for example has a TA value of 1.2 in respect of the coercive force and of 1.07 in respect of the relative remanence.

In addition to the temperature dependence of the magnetic properties, the field strength distribution of the individual particles of such magnetic materials is an important criterion in selecting materials for the manufacture of magnetic recording media. The field strength distribution of the individual particles is determined from the d.c. demagnetization curve. At a field strength which is equivalent to the remanence coercivity $H_R$, half (by volume) of the particles are reverse-magnetized. Accordingly, the remanence coercivity is a characteristic parameter for recording processes which, in particular, determines the bias setting for magnetic recording. The more non-uniform the remanence coercivity of the individual magnetic particles in the recording layer, the broader is the distribution of the magnetic fields which are able to reverse the magnetization of a defined volume of the recording layer. This is particularly noticeable if, because of high recording densities or short wavelengths, the boundary zone between zones of opposite magnetization is narrow. To characterize the distribution of the field strengths of the individual particles, a value $h_5$ for the total width of the residual induction curve and a value $h_{25}$ for the slope of the residual induction curve are determined from the d.c. demagnetization curve. The values are determined using the equations $$h_5 = \frac{H_{95} - H_5}{H_R}$$

and $$h_{25} = \frac{H_{75} - H_{25}}{H_R}$$

The subscript following the letter H indicates what percentage of the particles has in each case been reverse-magnetized. Unmodified gamma-iron(III) oxides have $h_5$ and $h_{25}$ values of about 1.66 and 0.57 respectively.

The cobalt-containing iron oxides produced according to the invention accordingly possess not only a higher coercive force but also slight temperature dependence and low $h_5/h_{25}$ values, as a result of which they are particularly suitable for use in magnetic recording media. These media are produced in a conventional manner. The magnetic materials are dispersed in polymeric binders; suitable binders are compounds known for this purpose, e.g. homopolymers and copolymers of vinyl derivatives, polyurethanes, polyesters and the like. The binders are used as solutions in suitable organic solvents, which may or may not contain other additives. The magnetic coatings are applied to rigid or flexible bases, such as disks, films and cards.

The Examples which follow illustrate the invention; in some of the Examples the dependence of the coercive force and other process parameters is illustrated graphically.

BRIEF DESCRIPTION OF THE DRAWINGS

In the drawings, FIGS. 1-4 graphically show the dependence of the coercive force on other process parameters.

The magnetic properties of the materials were measured by means of a vibrating sample magnetometer at a field strength of 160 or 800 kA/m. The coercive force $H_c$, measured in kA/m, was determined on the basis of a tap density of $\rho = 1.2$ mg/mm$^3$ ($H_{c(\rho=1.2)}$). The specific remanence $M_{r/\rho}$ and the specific saturation magnetization $M_{m/\rho}$ are each quoted in nTm$^3$/g, the latter property also being measured at a field strength of 800 kA/m as $M_{s/\rho}$ in nTm$^3$/g.

EXAMPLE A 1

12 kg of an acicular gamma-Fe$_2$O$_3$ having a mean length-to-width ratio of 10.5:1 and an $H_c$ of 24.3 kA/m are dispersed in 24 liters of water. 1,716 g of CoSO$_4$. 7 H$_2$O, dissolved in 3.6 liters of water, are added. Thereafter 4,908 g of NaOH, dissolved in 6 liters of water, are introduced, as a result of which the temperature rises to 30° C. 4,620 g of FeSO$_4$.7H$_2$O, dissolved in 5.6 liters of water, are then added dropwise in the course of 2 hours under a nitrogen blanket. The mixture is stirred for 6 hours at room temperature after which the viscous suspension is filtered and the filter residue is washed with water until the filtrate reacts neutral. The moist filter cake is dried, and heated, for 2 hours in a stream of nitrogen at 150° C. in a rotary kiln. The magnetic properties ascertained, the specific surface area ($S_{N2}$) determined by the BET method, and the magnetite content are shown in Table 1.

COMPARATIVE EXPERIMENT A 2

3 kg of acicular gamma-Fe$_2$O$_3$ having a mean length-to-width ratio of 10.5:1 and an $H_c$ of 24.3 kA/m are dispersed in 30 liters of water. 364 g of CoCl$_2$.6H$_2$O dissolved in 600 ml of water are added to the suspension and the mixture is stirred for 1 hour. 1,695 ml of 48% strength sodium hydroxide solution are then added and 232 g of Fe$^{2+}$ ions, in the form of a technical-grade FeCl$_2$ solution, are slowly introduced dropwise. After having been stirred for 6 hours, the suspension is filtered and the filter residue is washed neutral with water.

The moist filter cake is dried, and heated, for 2 hours in a stream of nitrogen at 150° C. in a rotary kiln. The results of the measurements are shown in Table 1.

EXAMPLE B 1

1,000 g of acicular gamma-Fe$_2$O$_3$ having a mean length-to-width ratio of 10.5:1 and an $H_c$ of 24.3 kA/m are dispersed in 2 liters of water. 20 g of CoCl$_2$.6H$_2$O are dissolved in a small amount of water and are added to the suspension, whilst stirring. 565 ml of 48% strength sodium hydroxide solution are then added in the course of 10 minutes and 38 g of Fe(II) ions, in the form of a technical-grade FeCl$_2$ solution, are introduced dropwise in the course of 60 minutes. The entire reaction takes place under a blanket of nitrogen, at room temperature. Stirring is then continued for 6 hours, after which the suspension is filtered and the filter residue is washed neutral with water.

The moist filter cake is divided into three parts: part B 1/I is treated for 2 hours at 180° C. in a stream of N$_2$, part B 1/II for 2 hours at 150° C. in a stream of N$_2$ and part B 1/III for 2 hours at 130° C. in a stream of air.

Figure 1:
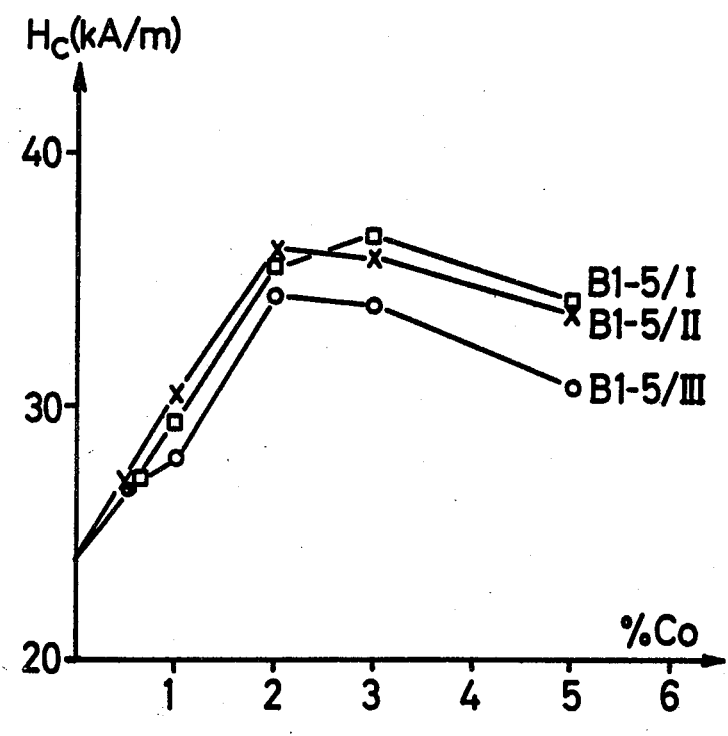

The coercive forces determined on samples B 1/I to B 1/III are shown in FIG. 1.

EXAMPLES B 2 TO B 5

The procedure followed is as described in Example B 1, except that the following quantities are added to the suspension:
Example B 2: 40 g of CoCl$_2$.6H$_2$O
Example B 3: 80 g of CoCl$_2$.6H$_2$O
Example B 4: 120 g of CoCl$_2$.6H$_2$O
Example B 5: 200 g of CoCl$_2$.6H$_2$O
In each case, the moist filter cake is divided into three parts and these are heated under the same conditions as in Examples B 1/I to B 1/III. The coercive forces subsequently determined on these samples are shown in FIG. 1.

EXAMPLE C 1

1,000 g of acicular gamma-Fe$_2$O$_3$ having a mean length-to-width ratio of 10.5:1 and an $H_c$ of 24.3 kA/m are dispersed in 2 liters of water. 20 g of CoCl$_2$.6H$_2$O, dissolved in a small amount of water, are added to the suspension with vigorous stirring, under a blanket of nitrogen. 565 ml of 48% strength sodium hydroxide solution are then added in the course of 10 minutes, after which 77 g of Fe(II) ions, in the form of a technical-grade FeCl$_2$ solution, are introduced dropwise in the course of 60 minutes. The contents of the reaction flask are constantly kept under a blanket of nitrogen. The reaction takes place at 25° C. After the FeCl$_2$ solution has been added, stirring is continued for 6 hours, the suspension is then filtered and the filter residue is washed neutral with water. The moist filter cake is divided into three parts, and part C 1/I is treated for 2 hours at 150° C. in a stream of nitrogen, part C 1/II for 2.5 hours at 110° C. in a stream of air and then for 1 hour at 150° C. in a stream of nitrogen, and part C 1/III for 2 hours at 130° C. in a stream of air.

Figure 2:
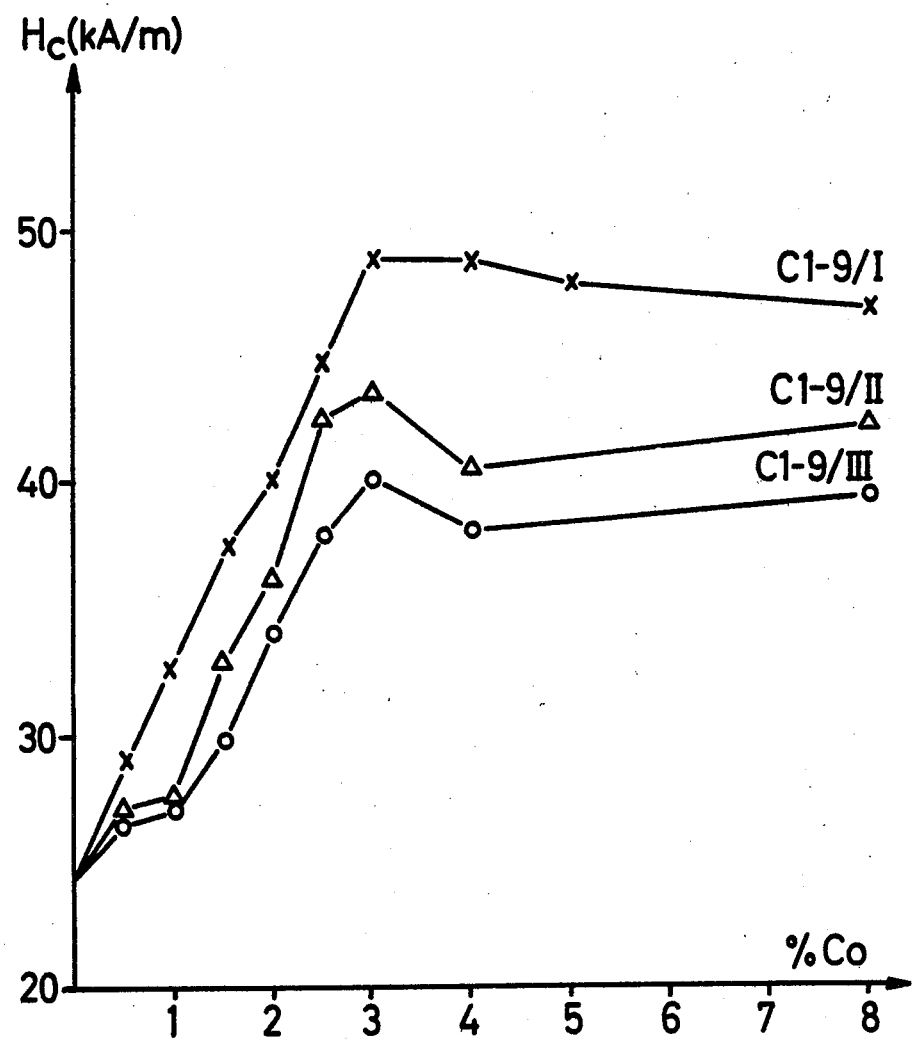

The coercive forces measured on samples C 1/I to C 1/III are shown in FIG. 2.

EXAMPLES C 2 TO C 9

The procedure followed is as described in Example C 1, but the Co content is increased, the following amounts being used:

TABLE 1

| | Modifer | Oxide: water ratio | Heat treatment | $S_{N2}$ m$^2$/g | Fe$_3$O$_4$ % | $H_c$ ($\rho = 1.2$) | $M_{r/\rho}$ | $M_{m/\rho}$ | TA | h$_{25}$ |
|---|---|---|---|---|---|---|---|---|---|---|
| Example A 1 | 3% of Co 7.7% of Fe$^{2+}$ | 1:2 | 150° C./N$_2$ 2 hours | 18.5 | 20 | 52 | 48 | 84 | 1.20/1.60 | 0.46 |
| Comparative Experiment A 2 | 3% of Co 7.7% of Fe$^{2+}$ | 1:10 | 150° C./N$_2$ 2 hours | 16.4 | 15 | 38 | 42 | 79 | 1.20/1.70 | 0.56 |

Example C 2: 40 g of $CoCl_2.6H_2O$
Example C 3: 60 g of $CoCl_2.6H_2O$
Example C 4: 80 g of $CoCl_2.6H_2O$
Example C 5: 100 g of $CoCl_2.6H_2O$
Example C 6: 120 g of $CoCl_2.6H_2O$
Example C 7: 160 g of $CoCl_2.6H_2O$
Example C 8: 200 g of $CoCl_2.6H_2O$
Example C 9: 320 g of $CoCl_2.6H_2O$

EXAMPLE D 1

1,000 g of acicular gamma-$Fe_2O_3$ having a mean length-to-width ratio of 11:1 and a mean particle length of 0.46 μm are dispersed in 2 liters of water. 40 g of $CoCl_2.6H_2O$, dissolved in a small amount of water, are added. 565 ml of 48% strength sodium hydroxide solution are then added in the course of 10 minutes, with vigorous stirring, followed by the dropwise introduction of 117 g of Fe(II) ions, in the form of a technical-grade $FeCl_2$ solution, in the course of 1 hour. The entire reaction is carried out under a nitrogen blanket, at room temperature.

After adding the $FeCl_2$ solution, stirring is continued for 6 hours, the suspension is filtered and the filter residue is washed neutral with water.

The moist filter cake is divided into four parts, and part D 1/I is treated for 2 hours at 180° C. in a stream of nitrogen, part D 1/II for 2 hours at 150° C. in a stream of nitrogen, part D 1/III first for 2.5 hours at 110° C. in a stream of air and then for one hour at 150° C. in a stream of nitrogen, and part D 1/IV for 2 hours at 130° C. in a stream of air.

Figure 3:
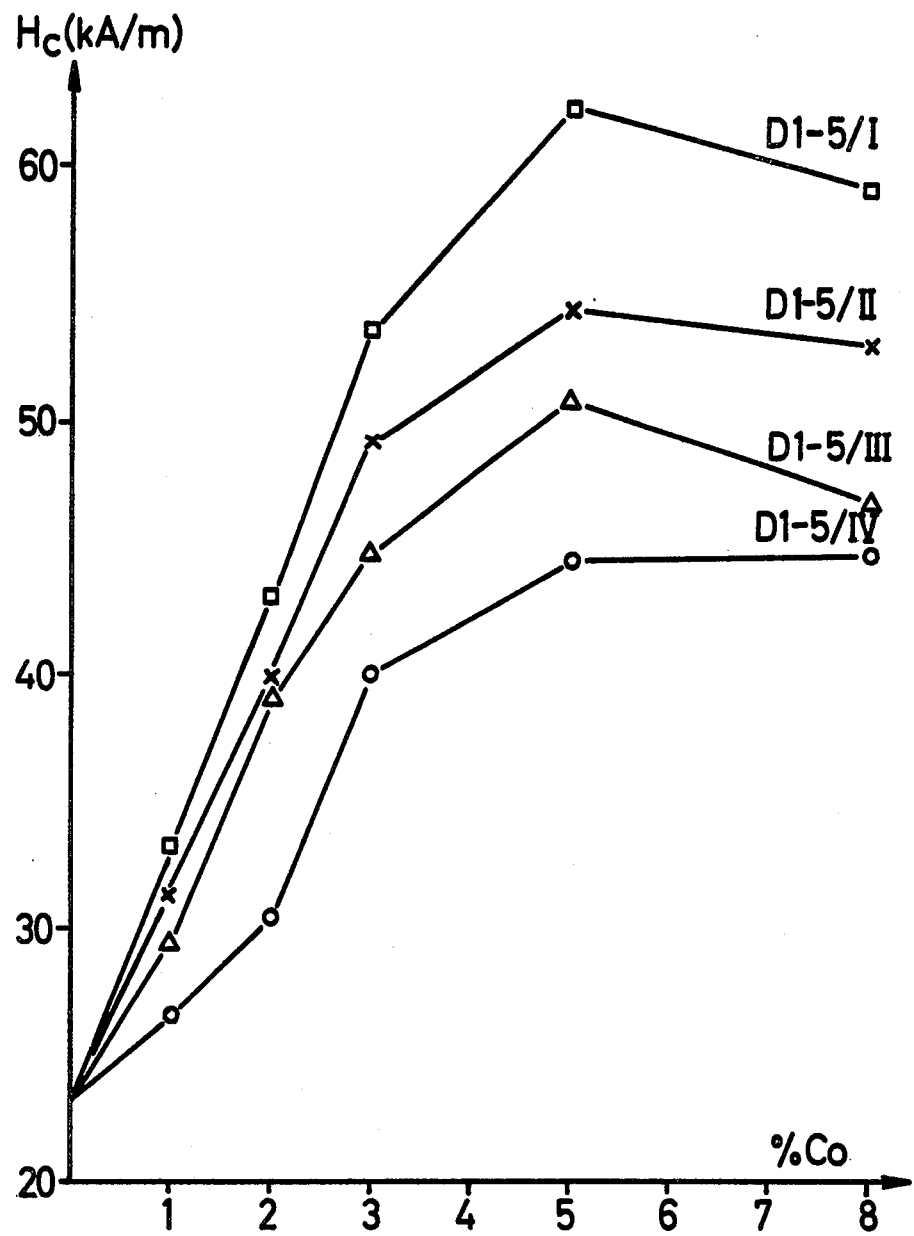

The coercive forces of the individual samples are shown in FIG. 3.

EXAMPLES D 2 TO D 5

The procedure followed is as described in Example D 1, but the cobalt content is increased, the following amounts being used:
Example D 2: 80 g of $CoCl_2.6H_2O$
Example D 3: 120 g of $CoCl_2.6H_2O$
Example D 4: 200 g of $CoCl_2.6H_2O$
Example D 5: 320 g of $CoCl_2.6H_2O$ In each case the moist filter cake is divided into 4 parts and treated as described in Examples D 1/I to D 1/IV. The coercive forces are shown in FIG. 3.

EXAMPLE E 1

1,000 g of acicular gamma-$Fe_2O_3$ having a mean length-to-width ratio of 10:1, a mean particle length of 0.48 μm and a coercive force of 23.3 kA/m are dispersed in 3 liters of water. 20.2 g of $CoCl_2.6H_2O$ are dissolved in the suspension whilst stirring under a nitrogen blanket at 24° C.

After stirring for one hour, 550 ml of 48% strength sodium hydroxide solution and 50.7 ml of technical-grade $FeCl_2$ solution containing 10 g of Fe(II) ions are added dropwise. Stirring is then continued for 6 hours, after which the suspension is filtered and the filter residue is washed neutral.

The moist filter cake is divided into three parts, and part E 1/I is treated for 2 hours at 120° C. in a stream of nitrogen, part E 1/II for 2 hours at 150° C. in a stream of nitrogen and part E 1/III for 2 hours at 180° C. in a stream of nitrogen.

The results of the measurements are shown in Table 2.

EXAMPLE E 2

The procedure followed is as described in Example E 1, except that twice the amounts of cobalt compound and iron(II) compound are added and precipitated. The results are shown in Table 2.

EXAMPLE E 3

The procedure followed is as described in Example E 1, except that four times the amounts of cobalt compound and iron(II) compound are added and precipitated. The results are shown in Table 2.

TABLE 2

| Example | Modifier | Heat treatment | $M_{m/\rho}$ | $M_{r/\rho}$ | $H_c$ ($\rho$ = 1.2) | $Fe_3O_4$ content |
|---|---|---|---|---|---|---|
| E 1/I | 0.5% of Co 1% of Fe(II) | 120° C./$N_2$, 2 h | 79 | 39 | 28.8 | 3.6% |
| E 1/II | " | 150° C./$N_2$, 2 h | 78 | 39 | 29.0 | 7.4% |
| E 1/III | " | 180° C./$N_2$, 2 h | 79 | 39 | 29.0 | 5.0% |
| E 2/I | 1% of Co 2% of Fe(II) | 120° C./$N_2$, 2 h | 80 | 40 | 29.8 | 6.3% |
| E 2/II | " | 150° C./$N_2$, 2 h | 82 | 41 | 30.7 | 11.3% |
| E 2/III | " | 180° C./$N_2$, 2 h | 78 | 40 | 31.6 | 5.5% |
| E 3/I | 2% of Co 4% of Fe(II) | 120° C./$N_2$, 2 h | 84 | 43 | 31.9 | 14.8% |
| E 3/II | " | 150° C./$N_2$, 2 h | 82 | 42 | 33.0 | 12.0% |
| E 3/III | " | 180° C./$N_2$, 2 h | 80 | 42 | 35.0 | 11.5% |

EXAMPLE F 1,000 g of acicular gamma-iron(III) oxide having a mean length-to-width ratio of 10.3:1, a mean particle length of 0.49 μm and an $H_c$ of 23.5 kA/m are dispersed in 2.5 liters of water. 65 ml of 48% strength sodium hydroxide solution are added dropwise to the suspension at room temperature under a nitrogen blanket, and stirring is continued for 30 minutes. Thereafter, 202 g of $CoCl_2.6H_2O$, dissolved in 500 ml of water, and 765 ml of technical-grade $FeCl_2$ solution, containing 150 g of Fe(II) ions, are simultaneously added dropwise to the suspension in the course of 50 minutes. Stirring is then continued for 6 hours under a nitrogen blanket, at room temperature. The suspension is filtered and the filter residue is washed neutral with water.

The moist filter cake is divided into three parts and Part F/I is treated for 7 hours at 180° C. in a stream of nitrogen, samples for determining the coercive force being taken after 1, 1.5, 2 and 4 hours, Part F/II is treated for 7 hours at 150° C. in a stream of nitrogen, samples for determining the coercive force being taken after 2 and 4 hours, and Part F/III is treated for 7 hours at 120° C. in a stream of nitrogen, samples for determining the coercive force being taken after 2 and 4 hours.

Figure 4:
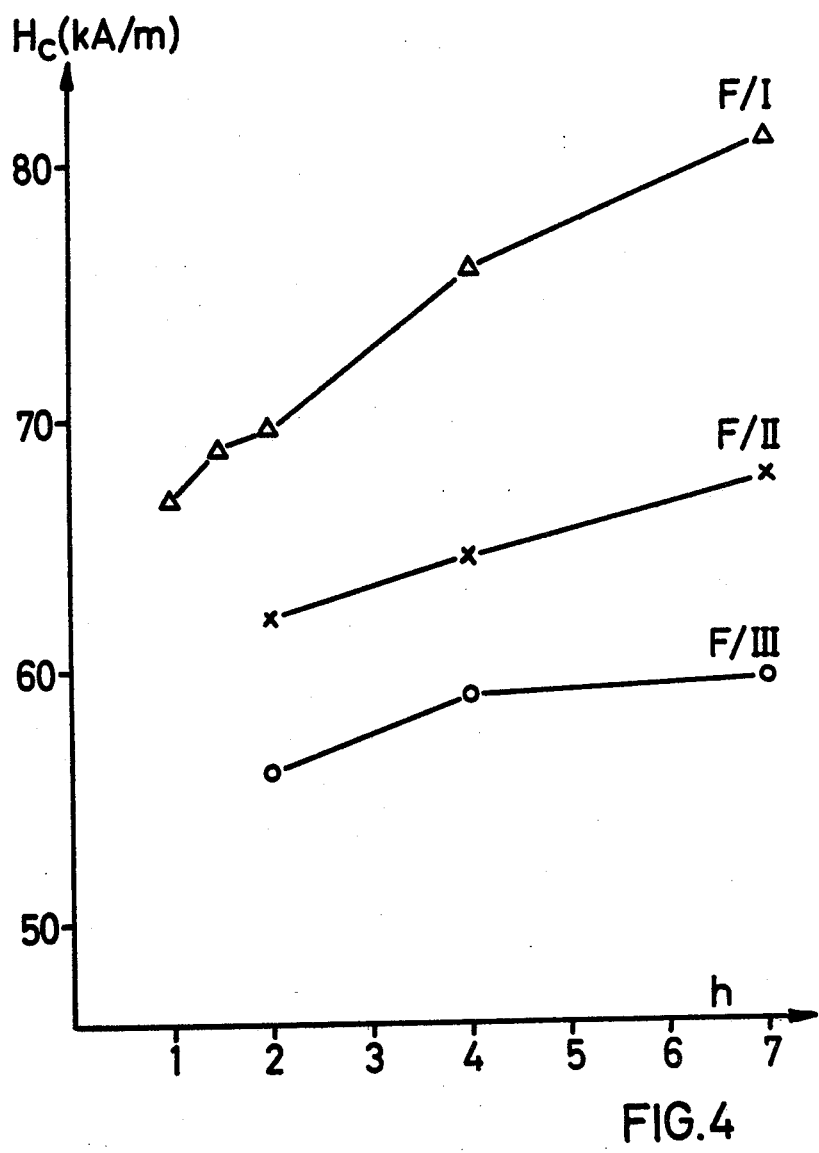

The variation of the coercive force as a function of the period of heating is shown in FIG. 4.

EXAMPLE G 1

700 g of acicular gamma-$Fe_2O_3$ having a mean length-to-width ratio of 10.6:1, a mean particle length of 0.48 μm and an $H_c$ of 24.1 kA/m are dispersed in 2.8 liters of water. 84 g of $CoCl_2.6H_2O$ are added to the suspension and the mixture is stirred for one hour. 395 ml of 48% strength sodium hydroxide solution are then added at room temperature under a nitrogen blanket, and 93 g of Fe(II), in the form of 513 ml of a technical-grade $FeCl_2$ solution, are then introduced dropwise into the suspension. The suspension is stirred vigorously for a further 6 hours and is then filtered, and the filter residue is washed neutral with water. The moist filter cake is treated for 2 hours at 130° C. in a stream of nitrogen. The magnetic properties found, and the magnetic content, are shown in Table 3.

COMPARATIVE EXAMPLE G 2

The procedure followed is as described in Example G 1 except that in place of Fe(II) ions 56.8 g of Fe(III) ions (per kg of starting oxide) are added dropwise. The filter cake is treated as described in Example G 1. The magnetic properties and the magnetic content are shown in Table 3.

COMPARATIVE EXAMPLE G 3

The procedure followed is as described in Example G 1, except that in place of Fe(II) ions 1.2 mols of $NaBH_4$, dissolved in 1 N NaOH, are added dropwise as the reducing agent. The heat treatment is carried out as described in Example G 1. The magnetic properties and the magnetite content are shown in Table 3.

TABLE 3

| Example | Modifier | Heat treatment | $M_{m/\rho}$ | $M_{r/\rho}$ | $H_c$ ($\rho=1.2$) | $Fe_3O_4$ content |
|---|---|---|---|---|---|---|
| G 1 | 3% of Co 13.3% of Fe(II) | 130° C./$N_2$, 2 h | 85 | 48 | 49.4 | 34.7 |
| Comparative Example G 2 | 3% of Co 5.68% of Fe(III) | 130° C./$N_2$, 2 h | 78 | 39 | 28.2 | 4.5 |
| Comparative Example G 3 | 3% of Co 1.2 mols of $NaBH_4$ | 130° C./$N_2$, 2 h | 81 | 41 | 32.0 | 32.0 |

EXAMPLE H 18 kg of acicular gamma-iron(III) oxide having a mean length-to-width ratio of 10.6:1, a mean particle length of 0.48 μm and an $H_c$ of 24.0 kA/m are dispersed in 54 liters of water. 3,640.5 g of $CoCl_2.6H_2O$, dissolved in a small amount of water, are added to the suspension at room temperature under a nitrogen blanket and the mixture is stirred for one hour. 10.6 liters of 48 percent strength sodium hydroxide solution are then added dropwise in the course of 8 minutes, followed by 14.22 liters of 32.2 percent strength technical-grade $FeCl_2$ solution (154 g of Fe(II)/kg of gamma-oxide) added dropwise in the course of two hours, and the suspension is then stirred for 6 hours at room temperature under a nitrogen blanket. Thereafter, it is filtered and the filter residue is washed with water until the filtrate reacts neutral. The moist filter cake is then divided into seven parts and is treated under the conditions given in Table 4. The Table also shows the magnetite content and the magnetic properties.

TABLE 4

| Example | Heat treatment | $M_{m/\rho}$ | $M_{r/\rho}$ | $H_c$ ($\rho=1.2$) | $Fe_3O_4$ content |
|---|---|---|---|---|---|
| H/I | 150° C./$N_2$, 2 h | 79 | 45 | 54.1 | 28.4% |
| H/II | 150° C./$N_2$, 7 h | 76 | 45 | 60.0 | 35.0% |
| H/III | 100° C./air, 2, 3 h and 150° C./$N_2$, 1 h | 80 | 46 | 52.4 | 30.0% |
| H/IV | 120° C./air, 2.5 h and 150° C./$N_2$, 1 h | 78 | 44 | 49.6 | 19.5% |
| H/V | 40° C./$N_2$, under reduced pressure | 77 | 43 | 44.3 | 22.5% |
| H/VI | 60° C./$N_2$, under reduced pressure | 68 | 42 | 46.2 | 7.5% |
| H/VII | 100° C./$N_2$, under reduced pressure | 73 | 42 | 49.7 | 26.6% |

EXAMPLE J 1,000 g of acicular gamma-$Fe_2O_3$, having a mean length-to-width ratio of 10.5:1, a mean particle length of 0.47 μm and an $H_c$ of 24.2 kA/m are dispersed in 2.5 liters of water. 323 g of $CoCl_2.6H_2O$ are dissolved in a small amount of water and added to the suspension. The reaction is carried out at 22° C. under a blanket of nitrogen. After having added the $CoCl_2.6H_2O$, the suspension is stirred for one hour and 700 ml of 48 percent strength sodium hydroxide solution are then added. 919 ml of technical-grade $FeCl_2$ solution (180 g of Fe(II) ions/kg of oxide) are then introduced dropwise, with vigorous stirring. After stirring for a further 6 hours, the suspension is filtered and the filter residue is washed neutral with water. The moist filter cake is divided into seven parts and these are dried under the conditions shown in Table 5. This Table also shows the magnetite content and the magnetic properties measured at 800 ka/m.

TABLE 5

| Example | Heat treatment | $M_{m/\rho}$ | $M_{r/\rho}$ | $H_c$ ($\rho=1.2$) | $Fe_3O_4$ content |
|---|---|---|---|---|---|
| J/I | 120° C./$N_2$, 7 h | 96 | 48 | 58.8 | 35.8% |
| J/II | 150° C./$N_2$, 2 h | 93 | 45 | 63.2 | 41.0% |
| J/III | 150° C./Ar, 2 h | 83 | 40 | 63.4 | 29.4% |
| J/IV | 150° C./$N_2$, 7 h | 83 | 42 | 68.0 | 37.7% |
| J/V | 180° C./$N_2$, 1 h | 86 | 43 | 58.1 | 32.8% |
| J/VI | 180° C./$N_2$, 7 h | 90 | 43 | 78.3 | 30.0% |
| J/VII | 130° C./air 2 h | 95 | 46 | 53.1 | 28.0% |

EXAMPLE K1

A magnetic recording medium is manufactured with a magnetic material obtained as described in Example C3/III. 900 parts of the material, 225 parts of a 20 percent strength solution of a copolymer of 80% of vinyl chloride, 10% of dimethyl maleate and 10% of diethyl maleate in a mixture of equal parts of tetrahydrofuran and dioxane, 808 parts of a 13 percent strength solution of a thermoplastic polyester-urethane obtained from adipic acid, 1,4-butanediol and 4,4'-diisocyanatodiphenylmethane, in a mixture of equal parts of tetrahydrofuran and dioxane, 54 parts of soybean lecithin, 0.9 part of a commercial silicone oil, 1.8 parts of hydroquinone, 1.8 parts of butyl stearate, 9 parts of isostearic acid and 620 parts of the stated solvent mixture are mixed, and dispersed, in a steel ball mill. The dispersion is then mixed with 1.5% of 4,4'-diisocyanatodiphenylmethane, filtered and applied in a conventional manner to a 6 μm thick polyethylene terephthalate film in such a thickness that, after orienting the acicular particles in a magnetic field and then effecting drying, a magnetic coating having the thickness d shown in Table 6 is obtained. The magnetic properties of the pigment, such as the coercive force $H_c$ [kA/m], residual induction $M_r$ [mT], saturation magnetization [mT], orientation factor RF, i.e. the ratio of the residual induction in the direction of particle orientation to that in the crosswise direction, and $h_{25}$ valve are measured at a field strength of 800 kA/m and are shown in Table 6, as are the electroacoustic properties, such as the maximum output level at short wavelengths $A_H$, and the sensitivity at short wavelengths $E_H$, measured, substantially in accordance with DIN 45,512, on a magnetic tape cut from the coated film, in comparison with the relevant reference tapes, at a recording frequency of 10 KHz.

EXAMPLE K2

900 parts of a material prepared as described in Example H/I, 225 parts of a 20 percent strength solution of a copolymer of 80% of vinyl chloride, 10% of dimethyl maleate and 10% of diethyl maleate in a mixture of equal parts of tetrahydrofuran and dioxane, 1,008 parts of a 13 percent strength solution of a thermoplastic polyesterurethane obtained from adipic acid, 1,4-butanediol and 4,4'-diisocyanatodiphenylmethane, in the same solvent mixture, 22.5 parts of zinc oleate, 0.9 part of a commercial silicone oil and a further 890 parts of the stated solvent mixture are mixed, and dispersed, in a steel ball mill. The resulting dispersion is used to manufacture a magnetic tape, and the magnetic and electroacoustic properties are measured, by the method described in Example K1. The results are shown in Table 6.

EXAMPLE K3

The procedure followed is as described in Example K2, except that the magnetic material employed is that prepared as described in Example J/VI. The results are shown in Table 6.

EXAMPLE K4

The procedure followed is as described in Example K2, except that the magnetic material employed is that prepared as described in Example A1. The results are shown in Table 6.

COMPARATIVE EXPERIMENT K5

The procedure followed is as described in Example K2, except that the magnetic material employed is that prepared as described in Comparative Experiment A2. The results are shown in Table 6.

TABLE 6

| Example | d[μm] | $H_c$[ka/m] | $M_r$[mT] | $M_s$[mT] | RF | $h_{25}$ | Reference tape according to DIN | $A_H$[dB] | $E_H$[dB] |
|---|---|---|---|---|---|---|---|---|---|
| K1 | 4.5 | 30.8 | 150 | 190 | 2.5 | 0.31 | T 308 S | +3.0 | +2.5 |
| K2 | 4.6 | 61.7 | 154 | 200 | 1.8 | 0.30 | C 401 R | +4.6 | +2.8 |
| K3 | 4.8 | 79.2 | 141 | 188 | 1.7 | 0.30 | C 401 R | +8.0 | +3.7 |
| K4 | 4.6 | 55.4 | 163 | 203 | 2.1 | 0.29 | C 401 R | +4.2 | +2.5 |
| Comparative experiment K5 | 4.6 | 41.2 | 146 | 190 | 2.2 | 0.32 | C 401 R | −1.2 | −0.7 |

We claim:
1. A process for the manufacture of acicular magnetic iron oxide which consists of a core of gamma-iron (III) oxide surrounded by a ferrite shell containing, based on the amount of magnetic material, from 0.2 to 12% by weight of cobalt (II) ions and from 0.1 to 15% by weight of iron (II) ions, wherein one part by weight of acicular gamma-iron (III) oxide is suspended in not more than four parts by weight of water by vigorous stirring, aqueous solutions containing cobalt (II) ions and iron (II) ions and aqueous bases to bring the pH of the suspension to not less than 10 are added to this suspension at from 20° to 80° C. under an inert gas blanket, with continued stirring, and after the cobalt (II) hydroxide and iron (II) hydroxide precipitate has formed under the inert gas atmosphere the entire solid product is filtered off, washed neutral with water and heated in an inert gas atmosphere for from two to seven hours at from 130° to 180° C.

2. A process for the manufacture of acicular magnetic iron oxide which consists of a core of gamma-iron (III) oxide surrounded by a ferrite shell containing, based on the amount of magnetic material, from 0.2 to 12% by weight of cobalt (II) ions and from 0.1 to 15% by weight of iron (II) ions, wherein one part by weight of acicular gamma-iron (III) oxide is suspended in not more than four parts by weight of water by vigorous stirring, aqueous solutions containing cobalt (II) ions and iron (II) ions and aqueous bases to bring the pH of the suspension to not less than 10 are added to this suspension at from 20° to 80° C. under an inert gas blanket, with continued stirring, and after the cobalt (II) hydroxide and iron (II) hydroxide precipitate has formed under the inert gas atmosphere the entire solid product is filtered off, washed neutral with water and heated in an oxidizing atmosphere for from one to three hours at from 110° and 150° C.

3. A process for the manufacture of acicular magnetic iron oxide which consists of a core of gamma-iron (III) oxide surrounded by a ferrite shell containing, based on the amount of magnetic material, from 0.2 to 12% by weight of cobalt (II) ions and from 0.1 to 15% by weight of iron (II) ions, wherein one part by weight of acicular gamma-iron (III) oxide is suspended in not more than four parts by weight of water by vigorous stirring, an aqueous solution containing cobalt (II) ions is added to this suspension, followed by the addition of aqueous bases to bring the pH of the suspension to not less than 10, both additions being made at from 20° to 80° C., thereafter an aqueous solution containing iron (II) ions is introduced with continued stirring under an inert gas atmosphere, and after the cobalt (II) hydroxide and iron (II) hydroxide precipitate has formed under the inert gas atmosphere the entire solid product is filtered off, washed neutral with water and heated in an inert gas atmosphere for from two to seven hours at from 130° to 180° C.

4. A process for the manufacture of acicular magnetic iron oxide which consists of a core of gamma-iron (III) oxide surrounded by a ferrite shell containing, based on the amount of magnetic mateial, from 0.2 to 12% by weight of cobalt (II) ions and from 0.1 to 15% by weight of iron (II) ions, wherein one part by weight of acicular gamma-iron (III) oxide is suspended in not more than four parts by weight of water by vigorous stirring, an aqueous solution containing cobalt (II) ions is added to this suspension, followed by the addition of aqueous bases to bring the pH of the suspension to not less than 10, both additions being made at from 20° to 80° C., thereafter an aqueous solution containing iron (II) ions is introduced with continued stirring under an inert gas atmosphere, and after the cobalt (II) hydroxide and iron (II) hydroxide precipitate has formed under the inert gas atmosphere the entire solid product is filtered off, washed neutral with water and heated in an oxidizing atmosphere for from one to three hours at from 110° to 150° C.

* * * * *